United States Patent [19]
Pollock et al.

[11] Patent Number: 5,311,839
[45] Date of Patent: May 17, 1994

[54] POULTRY FEEDER

[75] Inventors: Eugene B. Pollock, Assumption; Jeffrey Knollenberg, Taylorville, both of Ill.

[73] Assignee: Grain Systems, Inc., Earth City, Mo.

[21] Appl. No.: 991,383

[22] Filed: Dec. 15, 1992

[51] Int. Cl.[5] .................. A01K 39/012; A01K 39/014
[52] U.S. Cl. ..................... 119/53; 119/57.4; 119/61
[58] Field of Search ............ 119/53, 57.4, 52.1, 119/61; 248/62

[56] References Cited
U.S. PATENT DOCUMENTS

| | | |
|---|---|---|
| 984,980 | 2/1911 | Taylor . |
| 1,855,781 | 4/1932 | Tolley .................. 119/61 |
| 1,862,349 | 6/1932 | Perry .................. 119/61 |
| 1,864,569 | 6/1932 | Willauer .................. 119/61 |
| 3,033,163 | 5/1962 | Hostetler et al. . |
| 3,105,463 | 10/1963 | Pilch .................. 119/57.4 |
| 3,230,933 | 1/1966 | Myers et al. .................. 119/53 |
| 3,415,228 | 8/1966 | Myers .................. 119/51.11 |
| 3,598,087 | 8/1971 | Ramser et al. .................. 119/51.11 |
| 3,911,412 | 5/1974 | Murto et al. .................. 119/53 |
| 3,971,340 | 7/1976 | Allen .................. 119/53 X |
| 4,348,988 | 9/1982 | Lawson .................. 119/53 |
| 4,476,811 | 10/1984 | Swartzendruber .................. 119/53 X |
| 4,834,026 | 5/1989 | Brembeck et al. .................. 119/53 |
| 5,007,380 | 4/1991 | Badia et al. .................. 119/53 |
| 5,092,274 | 3/1993 | Cole et al. .................. 119/53 X |
| 5,113,797 | 5/1992 | van Daele .................. 119/53 |
| 5,184,570 | 2/1993 | Hostetler .................. 119/72 |

FOREIGN PATENT DOCUMENTS 449823 1/1926 Fed. Rep. of Germany ........ 119/61

OTHER PUBLICATIONS

Big Dutchman Broiler Feeder Brochure.
Big Dutchman Broiler Feeder Brochure.
Chore-Time Catalog "Breeder Pullet Feeding System".
Chore-Time Catalog "Now . . . There's a New Way to Feed Turkey Poults".
"The Chore-Time Advantage for Breeders" Model C2 Feeder p. 4.
Chore-Time Brochure Model C Breeder Feeder.
"Chore-Time Program Feeder" Model H Feeder.
Chore-Time Facts Sheet-Model H and CT.
Cumberland Catalog-"Grilless Frying Pan Feeding System".
SIPCO Brochure.
Cablevey Brochure.
Cablevey Brochure.
PEC Brochure.
Lohmann Angagenbau Brochure.
Hart Mfg. Co., Glendale, Calif. Pan Feeding Systems.

Primary Examiner—Robert P. Swiatek
Attorney, Agent, or Firm—Polster, Lieder Woodruff & Lucchesi

[57] ABSTRACT

A poultry feeder (10) comprising a generally vertically disposed feed tube (18) adapted to be installed on a generally horizontal feed conveyor tube (14) for receiving feed from the feed conveyor tube. The feed tube has an upper portion (26) fixed with respect to the feed conveyor tube and a lower portion (27) movable axially with respect to the upper portion between an extended position (as shown in FIG. 5) and a collapsed position (FIG. 6). A feed pan (23) is disposed below the bottom end of the feed tube for receiving feed. A lost motion connection (32) is provided between the feed pan and feed tube, with the lost motion connection including a generally vertically disposed rim (46) surrounding the outer portion of the feed pan and permitting relative movement between the feed pan and the feed tube between an extended position in which the feed tube is in its extended position and in which the rim extends up above the level of the feed pan thereby to aid in containing feed within the feed pan and a lowered position in which the feed pan rests on the floor and in which the rim is lowered with respect to the feed pan thereby to lower the height of the feed pan so as to permit young chicks or the like to readily view feed deposited within the feed pan and to have access to the feed therein.

48 Claims, 7 Drawing Sheets

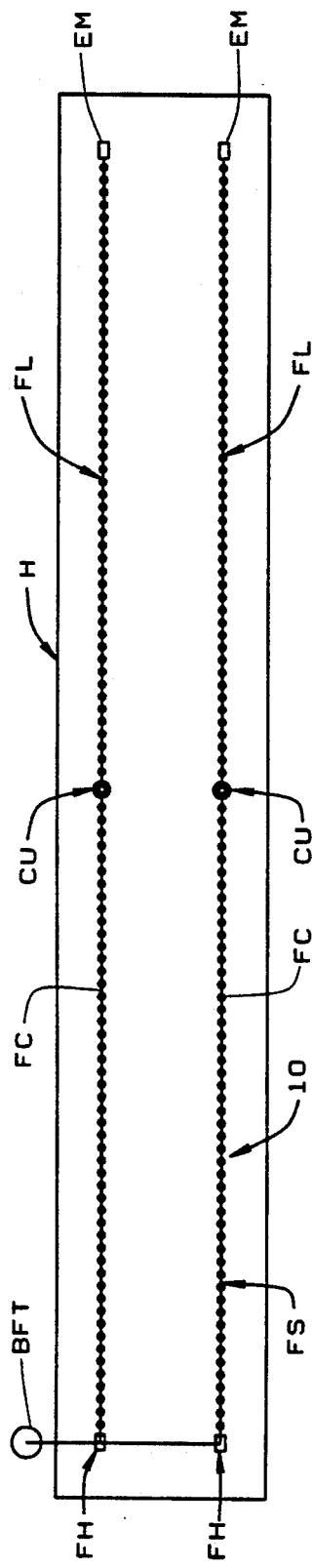
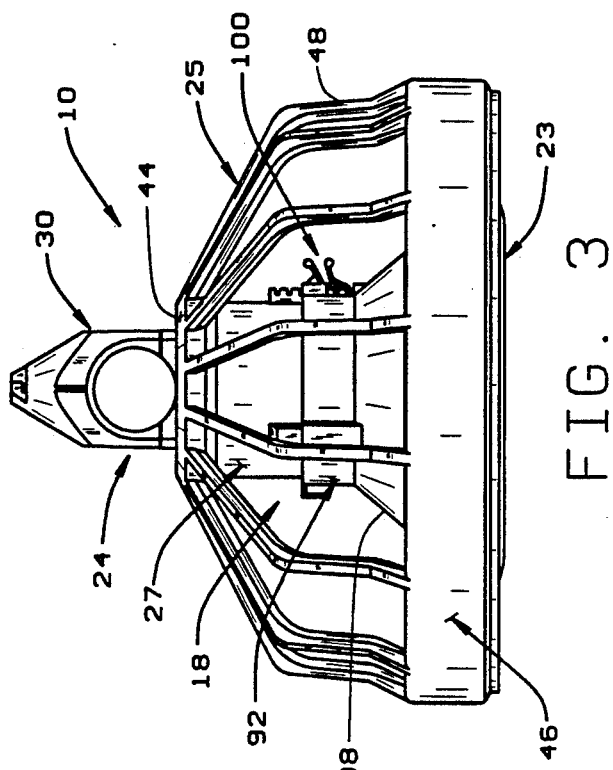
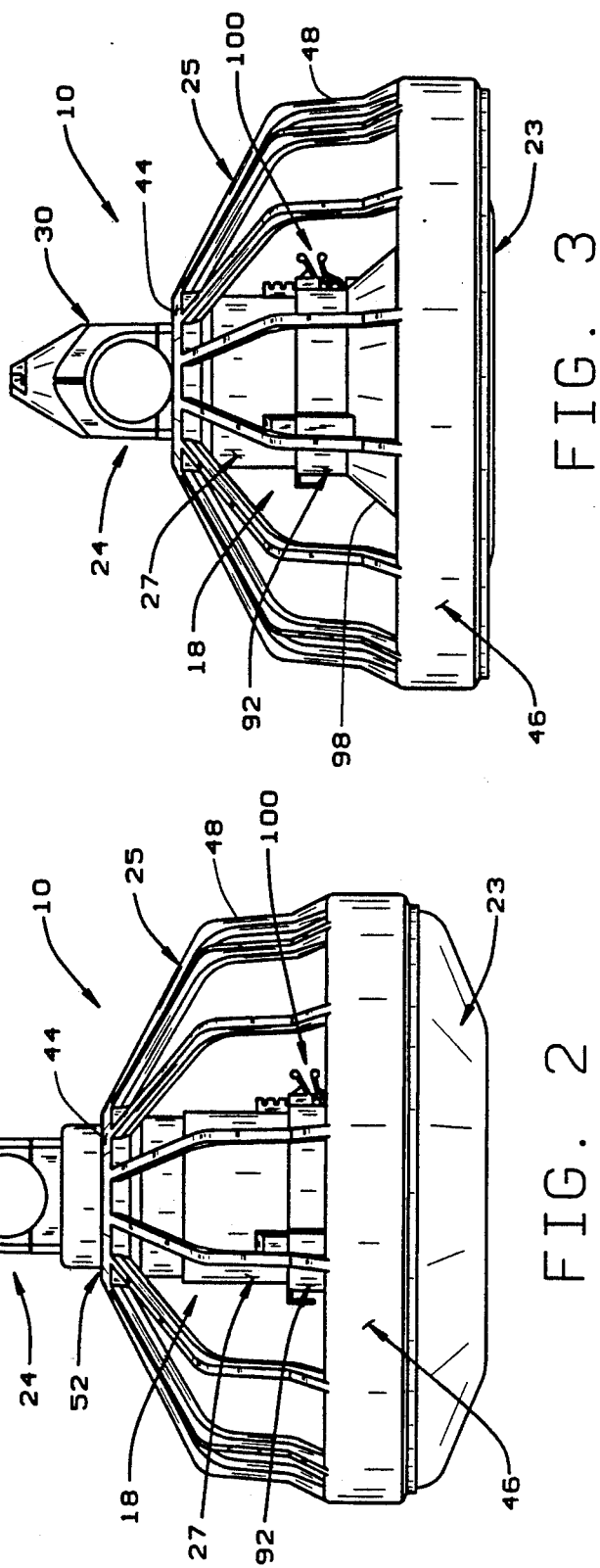

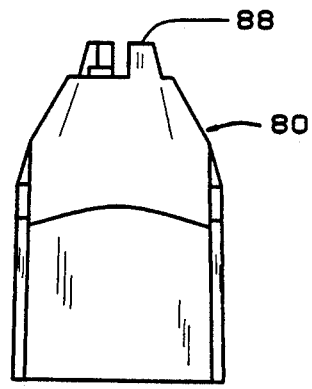
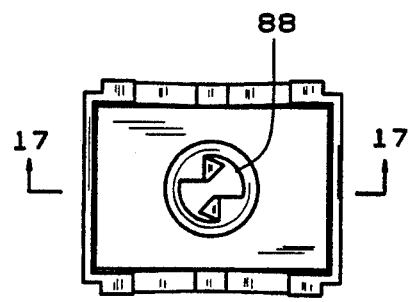
FIG. 15   FIG. 16
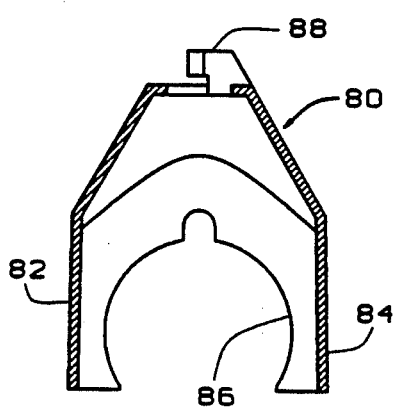
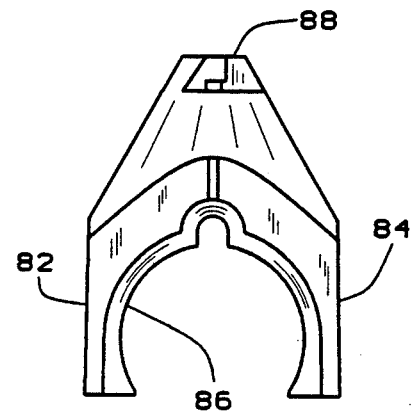
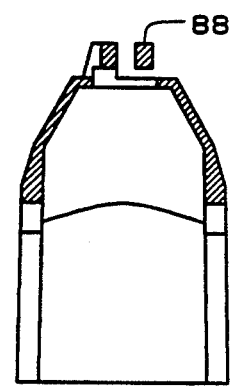
FIG. 17   FIG. 18   FIG. 19
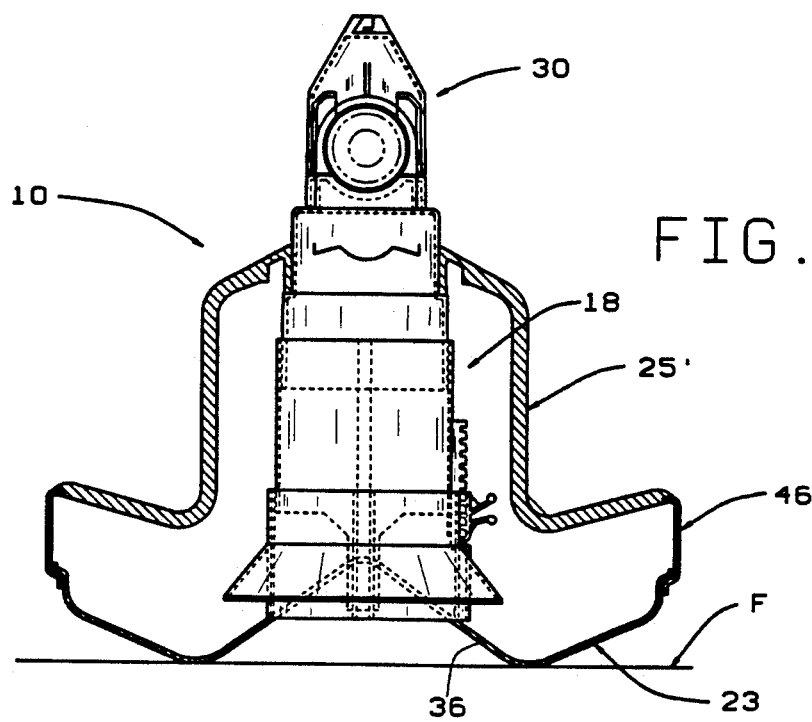
FIG. 20

POULTRY FEEDER

BACKGROUND OF THE INVENTION

This invention relates to poultry feed systems in which feed is conveyed to a series of feeding stations where it is dispensed for chickens (or other livestock) to eat and, more particularly, to a poultry feeder located at each of the feeding stations which allows young chicks to readily see and to have access to the feed in the feeder, and which is adjustable to retain feed in the feeder and to better accommodate larger birds as the birds mature.

Poultry feedings systems are well-known in the art. Examples of such feeding systems and feeders used in them are disclosed in U.S. Pat. Nos. 5,007,380; 4,476,811; 4,003,339; 3,971,340; 3,598,087; 3,415,228; 3,230,933; and 3,033,163. As shown in these various patents, feed from a bulk feed tank located outside of the poultry house is discharged into a hopper or similar intake receptacle. From there, the feed is conveyed through a conveyor tube to a sequence of spaced feed stations. From the conveyor, feed is deposited into a feed pan at each feed station. In the past, feeders were designed for use by older birds which had grown tall enough to see into and to reach the feed in the feed pan at the bottom of the feeder. For young chicks, it was recognized that these small birds could not see the feed in the feed pan and that the small chicks could not access the feed because the feed pan was often too high. Consequently, upon the introduction of chicks in a poultry house, feed was often simply deposited in piles on the floor of the house (or on a strip of paper laid on the floor) intermediate each of the feeding stations. This allowed the young chicks to see and to eat the feed in the piles, but resulted in substantial spoilage and waste of feed.

In the past, the feed conveyor tube was provided with openings intermediate the feeding stations which, so that prior to introduction of chicks into the house, may be opened to deposit piles of feed between the feeding stations. As shown in U.S. Pat. No. 4,488,509, shallow feed pans were sometimes used to contain the loose feed and to provide access to the chicks. Such shallow feed pans required substantial labor to install in the house prior to introduction of the chicks and still resulted in a substantial waste of feed.

It will be understood that a typical poultry house may be 40-60 feet wide and several hundred feet long. The feed conveyor may run in feed lines or in an endless loop the length of the house such that there are two or more rows of feed stations. The feeders in these feed lines are position so as to be relatively close together such at feedings. Typically, there would be about one feeder for every 60-65 birds. There may be several hundred feeders in the poultry house.

Such automated poultry feeding systems typically employed the use of one or more control feeding stations in the feed line to control the operation of the feed conveyor system. These control units were feeders positioned in the feed line at one or more desired locations so as turn on the feed conveyor when the birds had eaten the feed in the feed stations so as to insure that there was feed for the birds at all times. However, if the control unit operated differently than the other feeders in the feed line, or if there would be some difference between the control unit and the other feeders, the birds might well eat less more or less feed from the control unit than from the other feeders such that the amount of feed in the control unit was not representative of the feed in the other feeders.

Feeders were developed which might be usable by both young and more mature chicks. Such feeders are shown in the above-noted U.S. Pat. Nos. 4,476,811 and 5,007,380 which incorporated special windows in their feed drop tube which could be used to flood the feed pan with feed to insure access by the small chicks. While these feeders solved some of the problems, others still remained. One, for example, involved excess feed deposited in the drop tube and in the pan may become stale or off taste to the birds. This may result in the birds not eating as they should with a consequent slower growth rate or a lower conversion of feed into marketable poultry protein. This can lead to waste of the feed and spoilage of the feed.

A second problem involved adjusting the height of the pan so it is accessible by all of the chicks. Pans located at low spots or areas of the poultry house floor will be too high for young chicks to see or to reach into the feed pan. In practice, with a poultry house having a length of about 300 feet or so, it has been found necessary to maintain the level of the litter on the floor relative to the level of the feed line supported overhead to be within a close limit (e.g., 1-2 inches) so as to insure that all of the prior art flood window feeders would properly flood when the feed line was lowered toward the floor. In addition, if variations in floor level relative to the level of the feed line were present, variations as small as 1.5 inches could cause some of the feeders of the line to be properly adjusted for the height of the birds while others of the feeders would be too high for the birds to see the feed in the feeders. This could cause the birds to not feed at the feeders which were too high and to congregate at the other feeders such that too many birds would try to eat from one feeder. This could result in stress and in that birds may not obtain adequate feed rations and some birds may not grow at the desired rates. Also, the feed in the feeders that were too high might be wasted.

Third, the feeders were supported (suspended) from the conveyor tube and the latter was typically suspended from the roof of the poultry house by means of cables and winches such that the entire conveyor along with all of the feed pans may be raised and lowered, as shown, for example, in U.S. Pat. No. 3,033,163. While the height of the conveyor above the floor may be relatively uniform, variations in height still occurred. In feeders such as those described in the noted prior patents, height adjustment of the feeder relative to the floor is non-existent, or limited. Upon lowering the feeders toward the floor, one of the feeders contact the floor or the litter prior to the others (due to a high spot of the litter on the floor). This may thus place undue weight on this one feeder.

SUMMARY OF THE INVENTION

Among the several objects of the present invention may be noted the provision of a feeder for use in poultry houses which encourages the birds to eat from feeders as early as possible;

The provision of such a feeder by which feed is made visible and accessible to young chicks, thereby minimizing or alleviating the need to deposit feed on the floor of the house so that the chicks could see and have access to the feed;

The provision of such a feeder in which young birds can readily see and have access to the feed in the pan and therefore know where to obtain their food;

The provision of such a feeder in which the height of the feeder is adjustable relative to the height of the feed delivery system above the floor;

The provision of such a feeder in which the position of the pan is loosely supported on the feeder to accommodate variations in floor height relative to the overhead feed line and variations in floor or litter unevenness;

The provision of such a feeder in which the amount of feed delivered to the pan is controlled or regulated so that sufficient feed is always available, but so that excess amounts of feed, which can spoil, is not present in the pan which can be continuously supplied to the feed pan even if the feed conveyor is not operated;

The provision of such a feeder which is readily connectable to a feed delivery system that supplies numerous feeding stations within the poultry house;

The provision of such a feeder employing a hanger by which the feeder may be quickly and easily connected to or removed from the conveyor tube without having to remove any other feeding stations from the conveyor tube;

The provision of such a feeder that employs lost motion linkages to insure visual sighting of and physical access to the feed in the feed pan by young chicks to accommodate irregularities of the floor of the house, and to perform height adjustment;

The provision of such a feeder which is loosely mounted on the conveying tube such that if a larger bird (e.g., a capon or a turkey) bumps into a feeder suspended from the conveyor tube, the likelihood of injury to the bird will be lessened;

The provision of such a feeder in which feed within the feed drop tube is prevented from bridging thus insuring a uniform and constant supplying of feed from the feed drop to the feed pan;

The provision of such a feeder that can be readily installed on and removed from the conveyor tube without removing other feeders from the feed line, without removing the auger from the conveyor tube, and without having to disassemble the conveyor tube; and The provision of a feeder in which a hanger assembly for the feeders can be readily retrofitted into existing feeding systems.

A poultry feeder of the present invention comprises a generally vertically disposed feed tube adapted to be installed on a generally horizontal feed conveyor tube for receiving feed from the feed conveyor tube. The feed tube has an upper portion fixed with respect to the feed conveyor tube and a lower portion movable axially with respect to the upper portion between an extended position and a collapsed position. A feed pan is disposed below the bottom end of the feed tube for receiving feed. A lost motion connection is provided between the feed pan and the feed tube. This lost motion connection includes a generally vertically disposed rim surrounding the outer portion of the feed pan and constitutes a rim for the feed pan. The lost motion connection permits relative movement between the feed pan and the feed tube between an extended position in which the rim extends up above the level of the feed pan thereby to aid in containing feed within said feed pan, and a lowered position in which the feed pan rests on the floor and in which the rim moves downwardly with respect to the feed pan thereby to lower the height of the feed pan and to permit young chicks or the like to readily view feed deposited within the feed pan by the feed tube.

Other objects and features will be in part apparent and in part pointed out hereinafter.

BRIEF DESCRIPTION OF THE DRAWINGS

FIG. 1 is a diagrammatic plan view of a poultry house having an automated poultry feed system installed therein for supplying poultry feed from a bulk feed tank on the outside of the house to a multiplicity of poultry feeders of the present invention arranged in one or more feed conveyor lines within the house;

FIG. 2 is a side elevation view of a poultry feeder of the present invention viewed from the side of the feeder in line with the feed conveyor tube, the latter being raised and lowered with respect to the floor of the house by means of cable and winch arrangements or the like, with the feeder shown in its raised, suspended position in which a feed pan of the feeder is just in contact with the floor or is clear of the floor;

FIG. 3 is a view of the feeder similar to FIG. 2 in which the feeder is in its lowered, collapsed position in which a young chick just introduced into the house may readily visually see feed with in the feed pan of the feeder and have access thereto;

FIGS. 15-19 are various elevation and cross sectional views of a cap constituting a part of the hanger/connector of the present invention;

FIG. 20 (sheet 6) illustrates an alternative grill design for use with the feeder of the present invention;

Corresponding reference characters indicate corresponding parts throughout the drawings.

DESCRIPTION OF A PREFERRED EMBODIMENT

Figure 4:
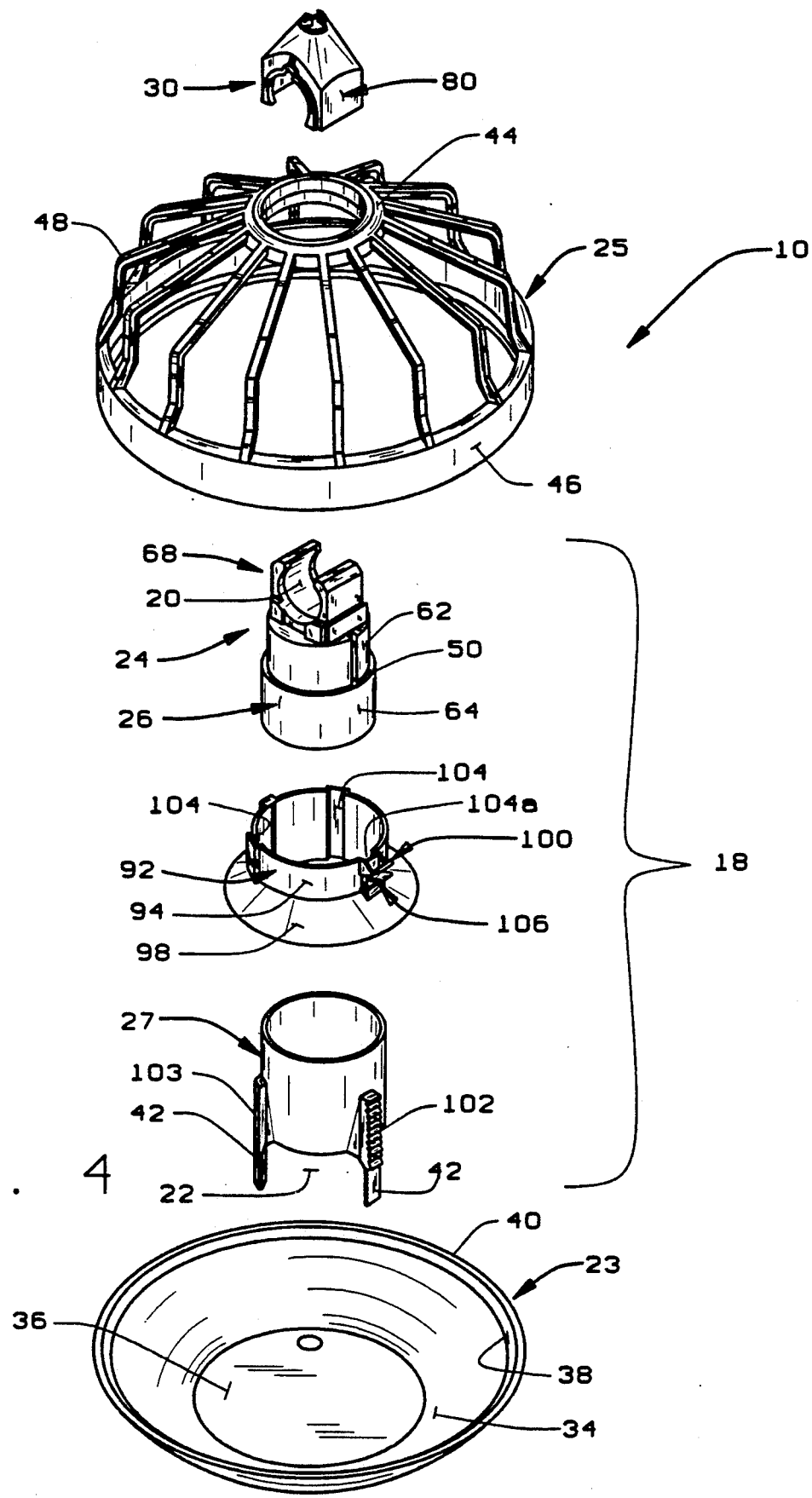
FIG. 4 is an exploded perspective view of the major components of the feeder of the present invention.

Referring now to the drawings and particularly to FIG. 1, a poultry house is indicated in its entirety at H. Typically, such poultry houses are long structures having a length of several hundred feet and a width of about 40-60 feet. For example, a typical poultry house H may have a length of about 300 feet and house about 15,000-20,000 birds. Typically, these poultry houses are equipped with an automated feeding system consisting of one, two, or more feed lines FL which typically run lengthwise of the house. Each of these feed lines has a feed hopper FH which receives poultry feed from a bulk feed tank BFT located outside of the poultry house. Each of the feed hoppers FH is connected to a feed conveyor FC comprising a feed conveyor tube 14 having an auger conveyor A (shown in phantom in FIGS. 5 and 6) therewithin. Auger A may rotatable driven by an electric motor EM within its respective conveyor tube. Alternatively, the auger may be a so-called centerless or flexible auger, such as shown in the prior art U.S. Pat. No. 4,460,230, or other such conveying means. If such flexible augers are used, it will be understood that the feed conveyor FC may be an endless loop within the poultry house with each elongate side of the loop constituting one of the feed lines FL.

Each of the feed lines has a multiplicity of feeding stations FS spaced therealong at substantially equal intervals (e.g., about 2.5 foot intervals). For example, in a feed line having a length of about 280 feet, there may be about 112 feed stations FS. Generally, growers prefer to have about one feeding station FS for every 60-65 grown broilers. Each of the feeding stations FS is herein shown to include a feeder 10 of the present invention.

More specifically, an improved poultry feeder 10 of the present invention is connected in poultry feed system FS such that feed delivered by feed conveyor FC is delivered to a multiplicity of feeders 10. The conveyor tube 14 is typically a horizontal tube suspended from the roof structure of the poultry house by means of a winch and cable mechanism (not shown in its entirety) so that the entire feed line FL including all of the feeders 10 mounted thereon may be simultaneously raised and lowered with respect to the floor F of the poultry house in the manner well known in the art. For example, such a typical winch and cable (or chain) lifting mechanism is described in U.S. Pat. No. 3,033,163, which is herein incorporated by reference. At each of the feeding stations FS located along the length of feed conveyor tube 14, an opening 15 is formed in the bottom of the conveyor tube so as to discharge feed into a respective feeder 10. If the feeder is full, no feed is discharged at that point, and feed will be conveyed to the next feeding station.

In a typical poultry operation, young chicks (perhaps as many as 20,000-40,000 one day old chicks) are introduced into a poultry house H at one time. The house typically has litter (e.g., wood chips) on the floor F. Feed is automatically supplied by means of the feed line FL and water is automatically supplied by automatic watering systems (not shown). Heretofore, small chicks have had a problem seeing the feed in conventional feed pans. To overcome this problem, and to teach young chicks to eat the feed, piles of loose feed were deposited on sheets of heavy biodegradable paper in the space between the feeding stations. After the young chicks learned to eat the loose feed (usually within a few days), additional feed would be supplied to the feed stations by means of the feed conveyor. By that time, the chicks had sufficiently grown such that they were able to see the feed in the feed stations. While this method of introducing feed to chicks worked well, it did result in substantial quantities of wasted or spoiled feed. It is a feature of the present invention that feed in the feed pan of feeder 10 is readily viewable by and is readily accessible to even small chicks thus eliminating or reducing the need for piles of loose feed. In this manner, the amount of spoiled or wasted feed is significantly reduced. It will also be appreciated that by using the feeder 10 of the present invention that the birds are introduced to feed at the earliest possible time from the feeder rather than from piles of loose feed on the floor or from so-called "chick" feed pans.

Figure 5:
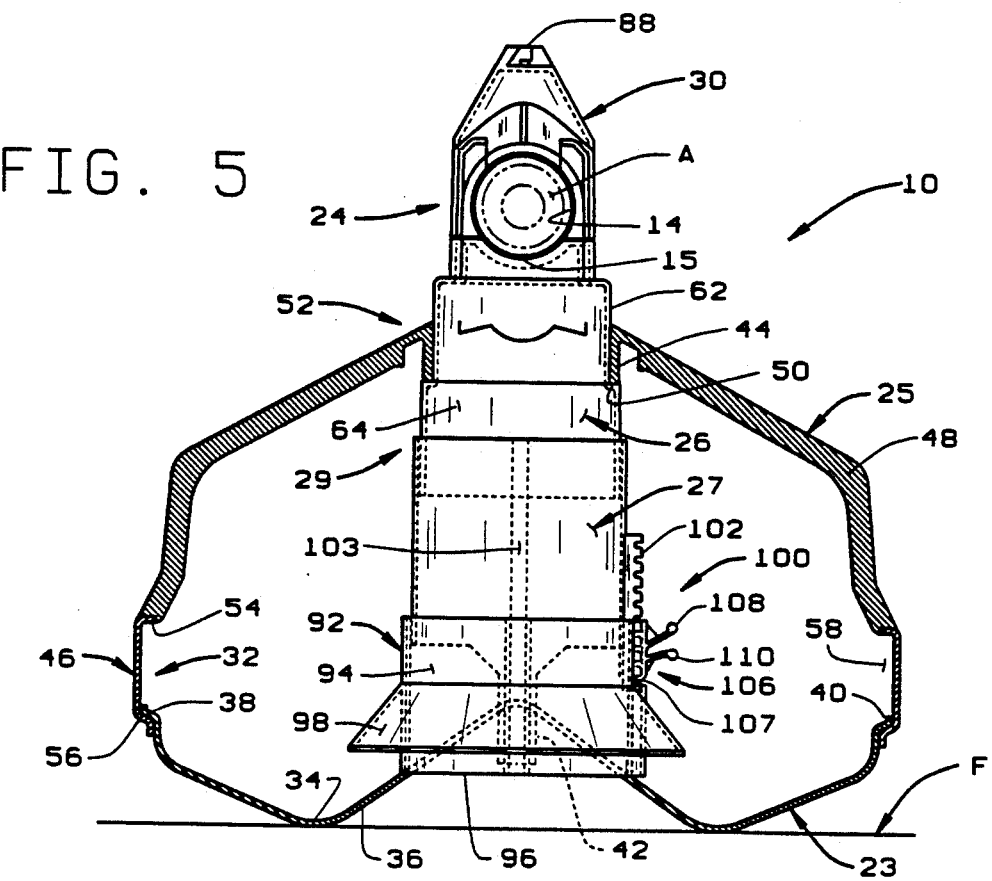
FIG. 5 is a partial cross sectional view of the feeder in its extended or suspended position illustrating the position of the major components of the feeder relative to one another.

The major components of feeder 10 are perhaps best shown in FIG. 4. More specifically, feeder 10 includes a centrally located vertical feed drop tube, as generally indicated at 18, into which feed is deposited from opening 15 (as shown in FIG. 5) in conveyor tube 14. Feed drop tube 18 has an inlet 20 at its upper end and a plurality of outlets 22 at its lower end. Feed drop tube 18 is vertically positioned in the feeder for the feed deposited into the tube to fall into a feed pan 23. Feeder 10 also includes a hanger or connector assembly, as generally indicated at 24, for removably attaching feeder 10 to a conveyor tube 14. Further, feeder 10 includes a preferable unitary grill assembly 25 (or other support means) for supporting the feed pan relative to drop tube 18 and for preventing larger birds from climbing into the feed pan.

Figure 6:
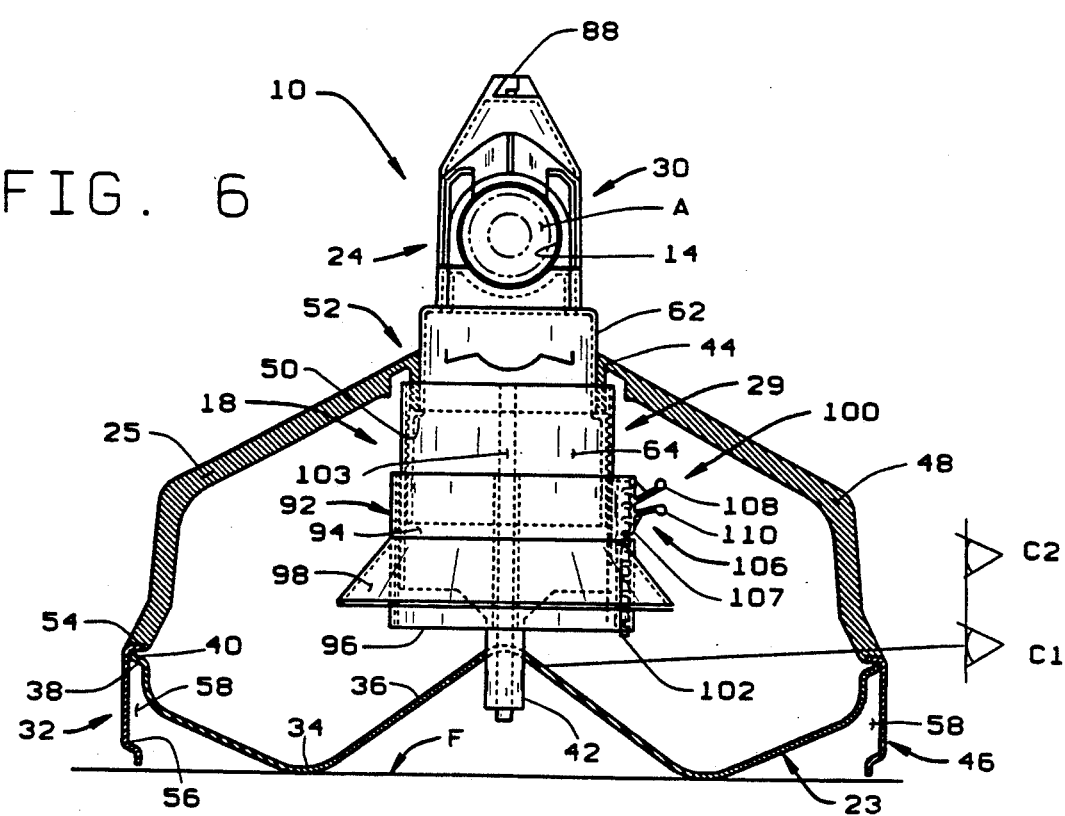
FIG. 6 is a view of the feeder similar to FIG. 5, but with the feeder in its lowered or collapsed position.

More specifically, feed drop tube 18 includes an upper drop tube 26 which is telescopically received in the upper or inlet end of a lower feed level drop tube 27. This telescopic connection of feed tubes 26 and 27 constitutes a first lost motion connection which, as is generally indicated at 29, is shown in FIGS. 5 and 6. The construction and operation of this first lost motion connection will be more fully described hereinafter. The upper end of upper drop tube 26 is removable attachable to conveyor tube 14 by means of hanger assembly 24 in a manner as will also be hereinafter more fully described. Hanger assembly 24 further includes a cap 30 which snaps onto the conveyor tube and locks the upper end of tube 26 in place on conveyor tube 14. As is described hereinafter, upper feed drop tube 26 and lower feed drop tube 27 are telescopically movable relative to each other to provide a lost motion connection by which the height of feeder 10, and, consequently the height of feed drop tube 18 will accommodate changes in height of feeder 10 for purposes as will appear.

Feed pan 23 is connected to upper drop tube 26 by way of a second lost motion connector means, as indicated generally at 32 (see FIG. 5), which permits relative vertical and angular (rocking) movement between the feed pan and the upper drop tube 26. More specifically, this lost motion connection 32 enables relative vertical movement of feed pan 23 and grill assembly 25 (i.e., a support for the feeder pan) between a fully extended position (also referred to as a deep pan position, as shown in FIG. 5) and a collapsed position (also referred to as a shallow pan position, as shown in FIG. 6). This lost motion connection 32 also provides an automatic adjustment between the feed pan 23 and unevenness (i.e., differences in the height of the litter on the floor F) or height variations of the floor F of the poultry house relative to the overhead feed line FL. This second lost motion connection 32 does this by compensating for differences in floor variation at each feeder location about the poultry house where feed stations are located. This prevents excessive weight from being applied to any one of the feeders 10 as the conveyor tube 14 is lowered relative to floor F if one of the feeders would first encounter a high spot on the floor.

Figure 7:
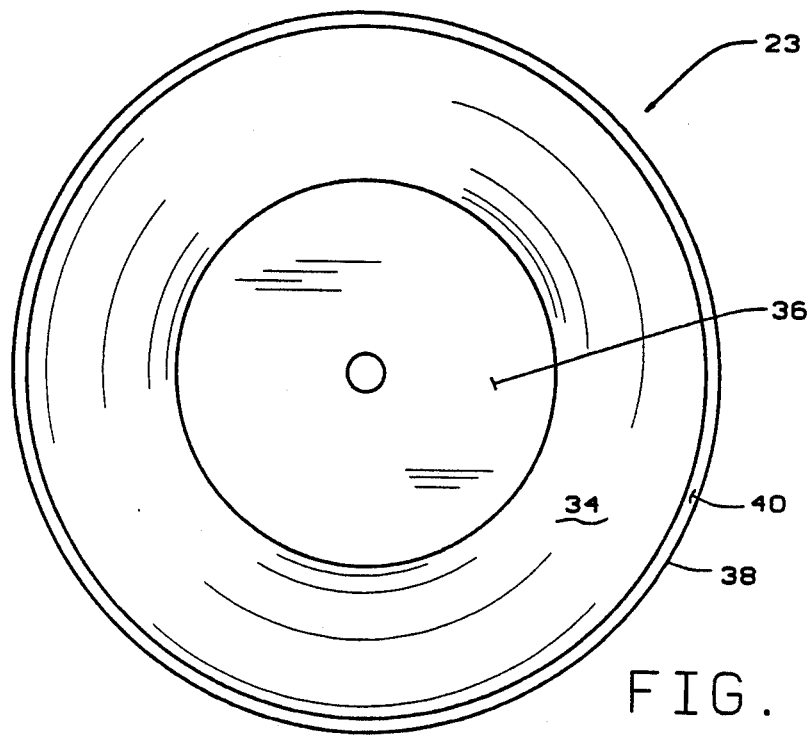
FIG. 7 is a top plan view of the feed pan.
Figure 8:
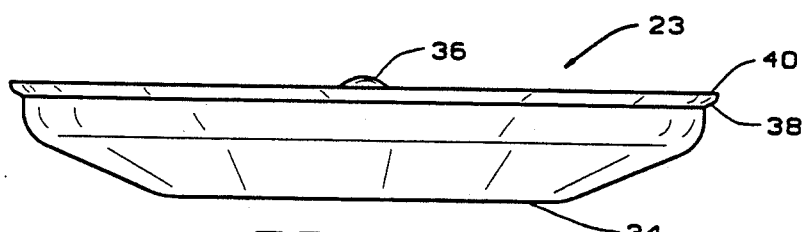
FIG. 8 is a side elevation view of the feed pan.

As best shown in FIGS. 7 and 8, pan 23 is shown to be a shallow, circular pan having a pan base 34, a central conical portion 36 extending upwardly for the pan base, and an upwardly turned sidewall 38. As shown in FIGS. 5 and 6, and as will be more fully described hereinafter, pan 23 is so shaped and sized that when feeder 10 is in its fully collapsed position (FIG. 6), a young chick having its eye at eye level C1 can see the feed in the pan while the chick is standing on floor F. Further, the height of sidewall 38 is such that a young chick may readily have access into the feed pan to eat the feed therein. An outwardly extending circumferential flange 40 is formed at the upper end of side wall 38.

Conical section 36 is generally aligned with the longitudinal centerline of feed drop tube 18. As shown in FIGS. 4-6, the bottom of the lower feed tube 27 has legs 42 extending down between openings 22 with these legs resting on the conical section. Thus feed delivered into feed drop tube 18 from conveyor tube 14 drops through the feed drop tube and flows through outlets 22 and is discharged onto conical section 36 and into the bottom of pan 23. The slope of the conical center section 36 of the feed pan is shown to be equal to (or preferable somewhat greater than) the angle of repose of the feed such that the conical surface distributes the feed out within the feed pan toward the rim of the feed pan so as to provide access to the feed by the birds, and the conical center 36 becomes covered with a uniform layer of feed thus maximizing the viewing surface of the feed in the pan, as seen by the birds. It will be understood that a variety of different feeds may be used in poultry operations and that the angle of repose of the feed may vary between about 25° and about 45°. Conical portion 36 is shown to have a slope of about 35° so as to approximate most feeds.

Figures 9, 10:
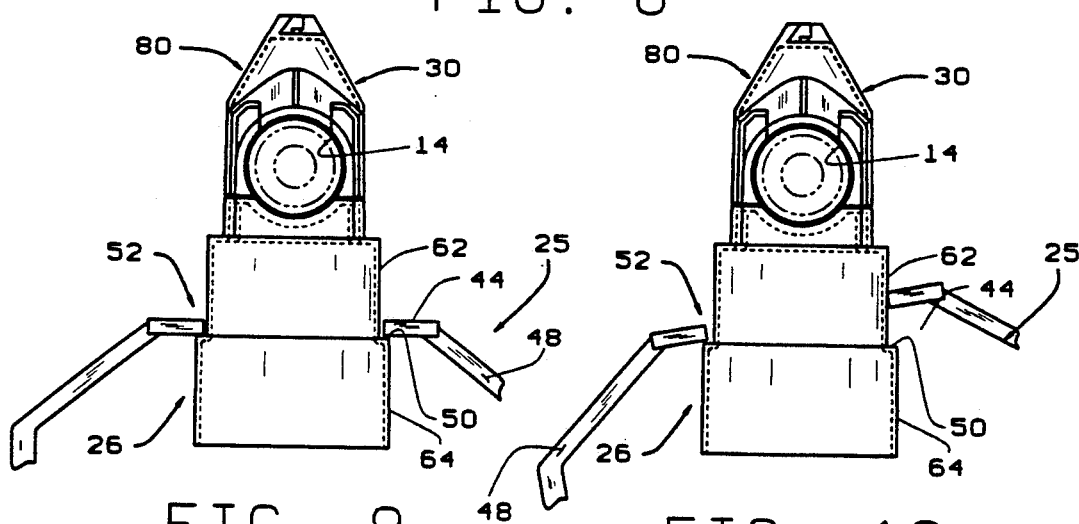
FIG. 9 is a partial side elevation view of the top portion of the drop tube with some parts shown in cross section illustrating the manner in which the grill is mounted on the drop tube so as to enable vertical and rocking movement of the grill on the drop tube.
FIG. 10 is a view similar to FIG. 9 illustrating the grill in a rocked or tilted position with respect to the drop tube.
Figure 11:
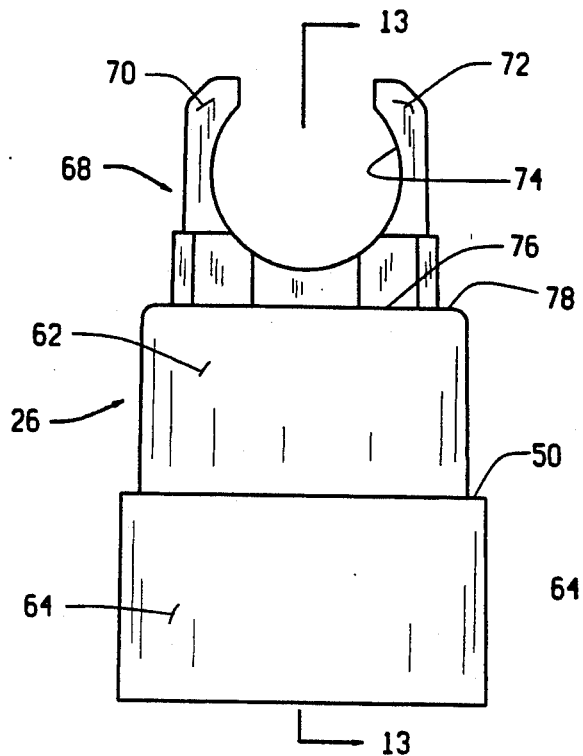
FIG. 11 (sheet 5) is a front elevation view of the upper portion or the drop tube.

The above-noted second lost motion means 32 includes grill assembly 25. The later, as shown in FIGS. 2-6, includes an upper collar 44, a lower circumferential rim 46, and a plurality of ribs 48. Preferably, the grill and its components are integrally molded of a suitable plastic. Collar 44 is sized to be loosely received on upper feed tube 26. Feed tube 26 has a shoulder 50 formed approximately midway of its length. Collar 44 at the upper end of the grill assembly bears or rests on shoulder 50 of tube 26 such that the grill and feed pan 23 are supported (suspended) therefrom when feeder 10 is in its fully extended or suspended position, as shown in FIGS. 2 and 5. It will be appreciated that as conveyor tube 14 is lowered toward floor F, and as the feed pan engages the floor, a third lost motion connection, as indicated at 52, between the grill collar 44 and tube 26 permits the collar to move both upwardly (as shown in FIGS. 2 and 3) and angularly (as shown in FIGS. 9 and 10) with respect to tube 26.

As shown in FIG. 4, grill assembly 25 has a plurality of equal angular spaced ribs 48 extending from collar 44 to the lower circumferential rim or ring 46. The number of ribs and their spacing is variable. However, they preferably are spaced sufficiently far apart such that small chicks can readily climb into the pan and such that larger birds can insert only their heads between adjacent ribs to get access to the feed.

As shown in FIGS. 5 and 6, rim 46 has spaced inwardly extending flanges or shoulders 54 and 56 at its upper and lower ends, respectively. These flanges, together with the inner circumferential wall of the rim 46 form a groove 58. Flange 38 and lip 40 of pan 23 are received within groove 58 of grill rim 46 such that the pan is movable within the groove for both vertical and angular (both rocking and rotational) movement thus permitting the pan to freely move between its raised or extended position (as shown in FIGS. 2 and 5) in which pan flange 38 rests against lower flange 56 of grill rim, and its collapsed position (as shown in FIGS. 3 and 6) in which flange 38 bears against upper flange 54 such that the grill and its rim 46 can move downwardly with respect to pan 23. The flange 38/rim groove 58 arrangement thus constitutes a lost motion connection 32 between feed pan 23 and rim 46 of grill 25. However, those skilled in the art will recognize that within the broader aspects of this invention the grill serves as a support between feed drop tube 26 and feed pan 23 and is a grill per se, not necessary for lost motion connection 32. Further, grill 25 may have other configurations, such as is indicated at 25′ in FIG. 20 (sheet 4). This alternate grill 25′ can be used to enable the lost motion of the pan and of the grill relative to the feed drop tube in the manner herein described, but the grill 25′ is the equivalent of a so-called grilless feeder.

This second lost motion connection 32 permits both vertical and rotational (or rocking) movement of pan 23 with respect to rim 46. Thus, upon lowering of feed pan 23 onto floor F and upon further lowering of conveyor tube 14, the effective height of feed pan 23 (i.e., the height of feed pan side wall 38 plus the height of rim 46) can be decreased to essentially the height of the feed pan flange. As shown in FIG. 6, this allows a young chick C1 to readily see feed in the feed pan and to readily climb into the feed pan for access to the feed, and to easily egress from the pan.

Upon the chicks growing and increasing in height, all of the feeding stations 10 of one of the feed lines FL may be raised as a unit along with conveyor tube 14. As the conveyor tube is lifted by the above-mentioned winch and cable lifting arrangement, lost motion connection 32 effectively raises rim 46 relative to feed pan which at least initially remains on floor F. With the height of feed pan 23 raised, the larger birds will still have access to the feed while standing on floor F, but the birds are prevented from raking or scattering feed out of pan 23.

Further, upon lowering the feed conveyor line 14 so that the feed pans 23 rest on floor F, lost motion connections 32 and 52 of each of the feeders 10 in the feed line FL enables the base 34 of each of the feed pans 23 to rest on the floor F of the poultry house, even if there are sharp variations (at least within a limited range) in floor height or litter evenness from one feeder to another, for example about 1-2 inches. Thus, even if the floor or the litter is uneven, pan 23 of a feeder 10 can rest on the floor at an angle while conveyor tube remains horizontal without imposing undue strain on the feeder or without one (or only a few of the feeders) supporting an undue share of the weight of the feeder line FL.

In addition to the feeder pan 23 being able to incline with respect to rim 46 as above described, it will be understood that by tilting the feeder pan with respect to the rim, the feeder pan may be readily "snapped" out of engagement from the rim for cleaning or replacement purposes. This can be done manually in a matter of seconds, without the necessity of disassembling the feed line FL and without the use of even simple hand tools.

As shown in FIGS. 9 and 10, the inner diameter of collar 44 is slightly greater than the diameter of the upper portion 62 of feed tube 26 above shoulder 50. As illustrated, this relation of the collar 44 being so supported on shoulder 50 permits the grill 25 to rock in any direction on shoulder 50. This means that grill assembly 25 will remain level (as shown in FIG. 9) if the floor is not level as the feeder 10 is lowered to rest on the floor. Further, this connection of the grill to feed tube 26 permits the grill assembly 25 and the feed pan 23 to readily tilt or give if a large bird (i.e., a turkey) bumps into a suspended feeder thereby possibly preventing injury to the bird.

As heretofore described, hanger/connector assembly 24 includes feed tube 26 and cap 30. Feed tube 26 is open at its upper end for receiving feed from opening 15 in feed conveyor tube 14. The lower end of feed tube 26 is larger in diameter than the upper end, with the transition from the upper and smaller diameter section 62 to the lower and larger diameter section 64 being at shoulder 50.

Figure 12:
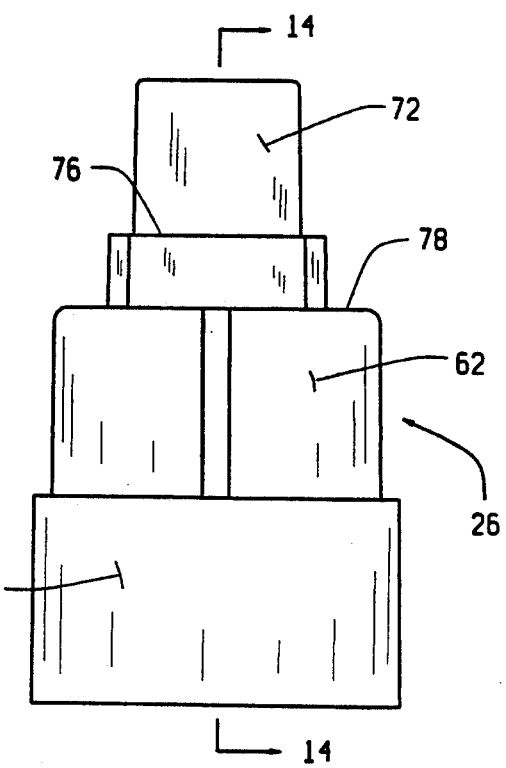
FIG. 12 (sheet 5) side elevation view of the upper portion of the drop tube shown in FIG. 11.
Figure 13:
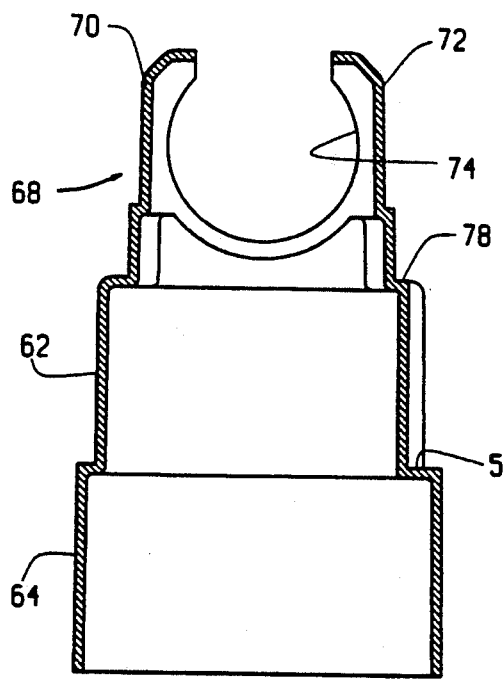
FIG. 13 (sheet 5) is a vertical cross sectional view taken along line 13—13 of FIG. 12.
Figure 14:
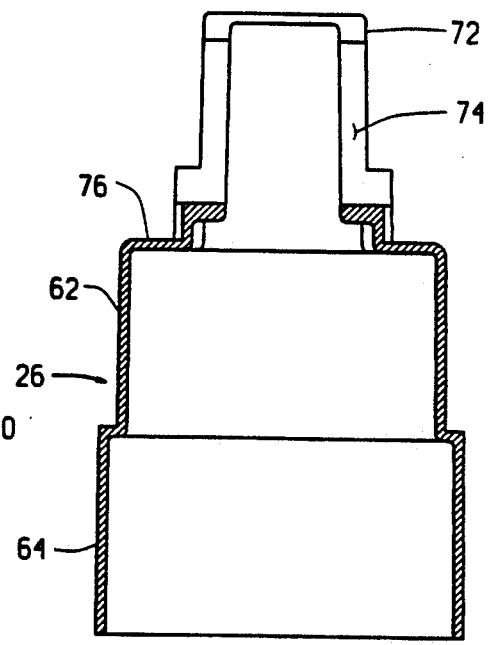
FIG. 14 (sheet 5) is a vertical cross sectional view taken along line 14—14 of FIG. 11.

Referring now to FIGS. 4, and 11-14, the hanger/connector 24 is shown to comprise a saddle 68 formed on the upper end of feed tube 26. The saddle is generally U-shaped and is defined by upwardly extending, spaced legs 70 and 72 formed integrally with feed tube 26 (which as previously noted is preferably molded on a suitable plastic material). The inner face of each leg has a concave curvature 74 corresponding to the diameter of conveyor tube 14. The saddle extends upwardly from a top face 76 of feed tube 26. The length and width of this top face is slightly larger than that of the saddle so that a horizontal shoulder 78 is formed around the outside of the base of the saddle. As best shown in FIG. 12, the body of saddle and of upper drop tube 26 is hollow so that feed from opening 15 of conveyor tube 14 is free to drop from the conveyor tube into the interior of drop tube 18 and into feed pan 23 of feeder 10.

The upper ends of legs 70, 72 are spaced apart a distance somewhat less than the diameter of conveyor tube 14. Since feed tube 26 and saddle 68 are preferably integrally molded of a suitable plastic material, the legs are resiliently movable away from each other when, with the saddle clear of conveyor tube 14, the conveyor tube is brought into contact with the inner edges of the legs and the conveyor tube is forcibly moved toward the base of the saddle. This exerts a camming action on the legs tending to spread them apart thus allowing the saddle to be snapped onto the conveyor tube. In this manner, a feeder incorporating the hanger/connector 24 of the present invention may be selectively installed in any desired location on the conveyor tube without requiring the removal or adjustment of any other feeders from the feed line.

Hanger/connector 24 further includes a cap 80 which is best shown in FIGS. 4 and 15-19, which is designed to fit over legs 70, 72 of saddle 68 after the feeder has been installed on conveyor tube 14 so as to secure or lock the feeder 10 in place on the conveyor tube. Cap 80 is preferably integrally molded of plastic or the like and has an upper base section with two spaced apart arms 82, 84. Like saddle legs 70, 72, the cap arms 82, 84 have a part circular inner surface 86 for cooperating with conveyor tube 14. The ends of cap arms 82, 84 are spaced apart a distance less than the diameter of the conveyor tube 14. Thus, when the cap is installed on the saddle legs 70, 72, the ends of the cap arms are cammingly spread apart by the conveyor tube such that the cap is snapped onto the conveyor tube. Further, the hanger/connector 24 effectively seals the conveyor tube at the location of the feeder 10 thus preventing the leakage of feed from the hanger/connector. It will be appreciated that with the cap 80 snapped in place on the conveyor tube, the feeder is suspended from the conveyor tube and is free to rotate about the conveyor tube. However, the feeder is gravity biased to assume a position where the feeder is substantially below the conveyor tube.

Cap 80 is hollow and is sized and shaped to fit closely over saddle 68 and to be snap locked over conveyor tube 14 to hold the cap in place. Cap 80 is provided with a shock wire guide 88 on its upper face for receiving and holding an electric shock wire (not shown) which is conventionally used to prevent birds from roosting on the conveyor tube 14.

As noted above, cap 80 fits snugly with the legs 70, 72 of saddle 68 so as to positively secure feed tube 26 to the conveyor tube 14. It will be appreciated that when cap 80 is installed on the saddle, the force required to pull the feed drop tube 26 from the conveyor tube is drastically increased.

It will also be appreciated that if the connector 24 of the present invention is employed, feeding stations 10 may be installed on and removed from conveyor tube 14 without removing the other feeders from the feeder line FL, without disassembling the conveyor tube 14, and without requiring the use of even simple hand tools. Also, if existing feed stations as manufactured by a variety of manufacturers may be modified or retrofitted with feed drop tubes 18 of the present invention having hanger/connector 24 incorporated therein. Thus, existing feeders may be readily modified for ready installation on and removal from their respective feed conveyor tubes. This retrofitting of existing feeders may be accomplished one at a time as required in the poultry house operations, or an entire feed line FL may be converted. To retrofit a single prior art feeder with the hanger/connector 24 of the present invention, the existing feeder is removed as expeditiously as possible from the feed conveyor. For example, the hanger of the existing feeder (which is typically made of plastic) may be cut from the conveyor tube 14. Drop tube 18 of the present invention is so designed that it may be used interchangeably with drop tubes and feeders from other feeder manufactured by a variety of poultry feeding equipment manufacturers. It will be appreciated that drop tube 18 may be sold independently of feeder 10 of the present invention for being retrofit into existing feeders that a grower may have on hand.

Referring to FIGS. 5 and 6, lower feed tube 27 has a uniform diameter along its length. As noted above, there are three (or more) outlet openings 22 formed in the base of the tube with the sidewalls of the outlet openings being defined by legs 42. The bottom of each leg 42 rests upon conical section 36 of feed pan 23 so as to define feed discharge openings for feed drop tube 18.

To control the amount of feed spread onto conical section 36 and discharged into feed pan 23 for consumption, the feeder 10 includes an outer feed level control tube, as indicated generally 92, which is installed over and which is axially movable with respect to lower feed tube 27. Outer tube 92 includes a cylinder wall 94 whose inner diameter is somewhat larger than the outer diameter of lower feed tube 27 such that cylinder wall 94 fits over the tube. The cylinder wall is substantially shorter than the feed tube. Wall 94 has a lower edge 96 as shown in FIG. 6). Outer tube 92 further has a circumferentially extending anti-raking skirt 98 formed on the outer face of the cylinder. Skirt 98 flares outwardly from its upper end and terminates slightly above the bottom of cylinder 92. This anti-raking skirt discourages birds from picking at feed through openings 22 which is still contained within feed tube 18.

To control the amount of feed deposited in pan 23, the position of the lower edge 96 of cylinder wall 94 relative to outlets 22 of feed tube 27 is adjusted. By uncovering more of openings 22, more feed from within feed drop tube 18 will be discharged into the feed pan. A pawl/rack mechanism 100 allows this adjustment and locks the cylindrical wall 94 in a desired axial position on feed tube 27. As shown in FIGS. 5 and 6, a rack 102 is integrally formed on one of the legs 42 of lower feed tube 27. The lower end of the rack extends along the leg below the upper end of the feed outlet openings 22. As best shown in FIG. 4, the legs 42 comprise raised surfaces 103 on the outer face of the feed tube. The rack is formed on the outer surface of one of the raised leg portions on lower tube 27.

As shown best in FIG. 4, grooves 104 are formed on the inner surface of outer tube 92 for receiving the legs 42 of lower tube 27. One of the grooves, as indicated at 104a, is adapted to receive rack 102. In that manner, it will be understood that outer tube 92 is free to move axially along the length of lower tube 27 and, due to the raised leg 103 and rack 102 portions on the outer surface of tube 27 being received in grooves 104 and 104a of outer tube 92, the latter is restrained from rotating on lower tube 27, but is free to move axially therealong. A pawl 106 (as best shown in FIGS. 5 and 6) is formed on outer tube 92 at so as to be movable (bendable) about a hinge point molded into the pawl between an engaged position (as shown in FIGS. 5 and 6) and a raised or released position (not shown) such that with a pawl finger 107 in its engaged position the outer tube 92 is fixed with respect to lower tube 27 and with the pawl in its released position, the outer tube and the anti rake ring 98 may be readily adjusted along the length of the lower tube 27 so as to regulate or control the flow of feed from outlet openings 22 in the lower end of tube 27 into the feeder pan. The pawl includes an upper and lower outwardly extending finger tabs 108, 110, respectively, which permit the ready release of pawl finger 107 from the teeth of rack 102 and serve as a handle for the ready, manual adjustment of the outer tube 92 on lower tube 27. Accordingly, when it is desired to adjust the flow of feed out of openings 22, the finger tabs 108, 110 are pinched together which releases pawl finger 107 from rack 102 thus enabling axial movement of the outer tube on the lower tube. After moving the outer tube 27 upwardly or downwardly, the finger tabs are released and the pawl finger resiliently returns to its normal position engaging the rack thereby to lock the outer tube in place.

Vertical adjustment of the lower edge 96 of cylinder wall 94 effectively changes the area of feed discharge openings 22 and regulates the feed flowing into pan 23. If the lower edge 96 is raised, more of the outlet openings are exposed and more feed is delivered to the pan. As the feed flows down the side of cone section 36 of the feed pan and cascades into the pan, it comes to rest such that it forms an angle with respect to the bottom of the pan. The slope of the feed depends on the height of lower edge 96 and the angle of repose of the feed. With the outer tube in a raised position, the amount of feed in the pan is maximized. If the feed is rapidly consumed by the poultry, additional feed stored within feed drop tube 18 will constantly replace that eaten. It will be understood that the feed in drop tube 18 serves as a feed reservoir. If, on the other hand, the feed tends to remain in the pan a long time, the question of freshness or spoilage (with consequent waste and lower conversion by the birds) arises. To regulate the amount of feed available for consumption, the lower edge 96 can be raised or lowered. This makes the amount of the feed in the pan more shallow than before and insures that less feed is deposited into the pan. However, to the birds visually seeing the feed, it will appear as if a full ration of feed has been dispensed. If the lower edge 96 is already in a lowered position and the pan tends to be constantly empty, or nearly empty, it means the feed is being consumed faster than thought. Raising the lower edge 96 then increases the amount of feed discharged such that a greater quantity of feed is available in the pan. Alternatively, the feed conveyor can be operated more frequently to deliver feed more often.

Also, with the construction of feed drop tube 18, as above described, it will be understood that a wide range of feed dispensing settings are available to the grower by merely adjusting outer tube to cover or uncover openings 22 as required. Further, the height of openings 22 (once outer tube is in a set position) are constant with respect to the conical projection 36 of the feed pan throughout the range of movement of the feeder from its collapsed to its fully extended positions. Thus, if the outer tube is not adjusted, the same amount of feed will be presented to the birds as the feeder's height is adjusted.

It will be appreciated that as feed flows out of openings 22 and into the feed pan 23, at some point the amount of feed in the pan will block the flow of any additional feed from the openings. The continued delivery of feed to the feeder 10 will cause feed drop tube 18 to become filled. When the drop tube is filled, the feed therein serves as a reservoir. Continued operation of the conveyor after a feed drop tube has been filled causes the feed in conveyor tube 14 to be passed along to the next successive feeder until all of the feeders in the feed line FL have been filled and until the conveyor tube between each of the feeders is charged with feed. Thus, upon restarting of the conveyor, feed within the conveyor tube between each of the feeders will be initially delivered simultaneously to all of the feeders so as to prevent birds from congregating at one or at a few of the feeders which are first to receive fresh feed upon start-up of the conveyor.

With feeder 10 having discharge openings 22 at the bottom end of feed tube 27, it is insured that feed is discharged into the pan on a "first in, first out" basis and that no feed remains trapped within the feeder or the feed tube 18.

Referring now to both the upper tube 26 and the lower tube 27 of drop tube 18, especially as shown in FIGS. 5, 6, 13, and 14, it will be noted that the diameter of drop tube 18 progressively increases from the top to the bottom. This progressive increase in drop tube diameter results in lessening the tendency of feed within the drop tube from bridging (sticking) within the drop tube so as to facilitate the steady and uninterrupted flow of feed to the feed pan, even as the feed is slowly eaten by the birds such that feed from the interior of the feed tube will slowly flow therefrom so as to replenish the feed in the feed pan.

With regard to the lost motion connection 32 between the lower end of grill assembly 25 and pan 23, the distance taken up by the arrangement is the distance measured between upper and lower rim surfaces 54 and 56 of rim 46. In essence, the rim is allowed to drop to or below the upper level of the upper edge 40 of feed pan 23. The height of the feed pan and the height of the rim are sized so, when the rim is in its lowered position (as shown in FIG. 6), as to permit very young chicks to visually see the feed within the pan with the rim lowered and so that the young chicks can readily access the feed by climbing into the feed pan. As the birds grow in height, the conveyor tube 14 may be raised by the cable and pulley lifting arrangement and the lost motion connection 32 will initially lift the rim 46 relative to the pan 23 which may remain resting on floor F until all of the lost motion of lost motion connection 32 is taken up. This has the result of effectively increasing the height of the feed pan so as to prevent the now larger birds from wasting feed by raking feed out of the feed pan and out of feed tube 18.

It will be further appreciated that with the feeder 10 of the present invention in its lowered position, that the length of feed tube 18 is minimized. Since the feeder is intended to be in its lowered position when the birds are the smallest (and when they consequently eat the least amount of feed), the volume of feed contained within the feed tube is also minimized. In turn, this minimizes that amount of feed held in the feed tube that may go stale or off flavor. As the birds grow in size and begin to consume feed at a higher rate, the feeder 10 is adjusted to its more fully extended position (as shown in FIG. 5) thus also increasing the volume of the feed tube with a consequent increase in the volume of feed in the feed tube so as to constitute a greater feed reservoir. This insures that ample feed is present in the feeder at all times.

Still further, with feeders 10 of the present invention, it will be appreciated that young birds are trained from their initial introduction into the poultry house to consume feed from the same type of feeder and from the same feed cycle throughout their entire growing cycle. The birds are not required to make a transition from feeding from piles of loose grain to a feeder. Nor is there any need to transition the birds from feeding from a flood condition, as is the case with feeders having special chick windows used to flood the feed pans with feed.

What has been described is a feeder for use in a poultry houses for feeding both young chick and older birds without having to change any of the settings of the feeder. Instead, the feeders need only be lifted by means of the conveyor winch and cable lifting arrange from their lowered positions (see FIG. 6) to their extended or suspended positions (FIG. 5) so as to accommodate the larger birds. By enabling young chicks as well as older birds to see the feed within the feed pans, the need to deposit feed on the floor or on paper for the younger birds may, in at least some cases, be either eliminated or greatly reduced. In addition, the position of the feed pan is separately adjustable, also by a lost motion connection, to account for variations in floor height and unevenness. The amount of feed delivered to the pan is controlled so sufficient feed is always available for the birds but excess feed, which can spoil, is not.

Referring to the lost motion connection 52 between grill collar 44 and upper drop tube 26, it will be understood that, as described in regard to FIGS. 9 and 10, this lost motion connection prevents undue strain from being imposed on feed drop tube 18 and permits the ready telescopic movement of the feed tube section without binding in the event the feed pan 23 rests of an uneven floor F. The degree of angular displacement permitted by lost motion connection 52 depends upon the amount of clearance between the inner diameter of collar and tube 26.

Still further, the lost motion connections of feeder 10, upon adjusting the height of the feeders above the level of floor F as the birds begin to grow insures that the feed pans are presented to the birds at a desired relation to the level of the floor at the position of the feeders. In other words, if the feeders of a feed line FL are initially resting in their lowered positions (as shown in FIG. 6) on a floor that is "stair stepped", the conveyor tube will be lowered until the feed pans 23 of the feeders for the lowest part of the floor rest on the floor. The lost motion connection 52 between the grill and the feed drop tube enables the feeders on the high floor areas to further collapse so at the feed pans of the feeders for the low areas can continue to move downwardly until the feed pans can move to their fully collapsed positions. Likewise, upon lifting such a feed line, the feeders on the high spots will remain on the floor as the lower feeders are raised to their desired heights. This insures that none of the feed pans will be raised too high above their local floor heights such that all of the birds will have ready access to the feed in the feed pans of the feeders, regardless of variations in local floor heights.

Figure 21:
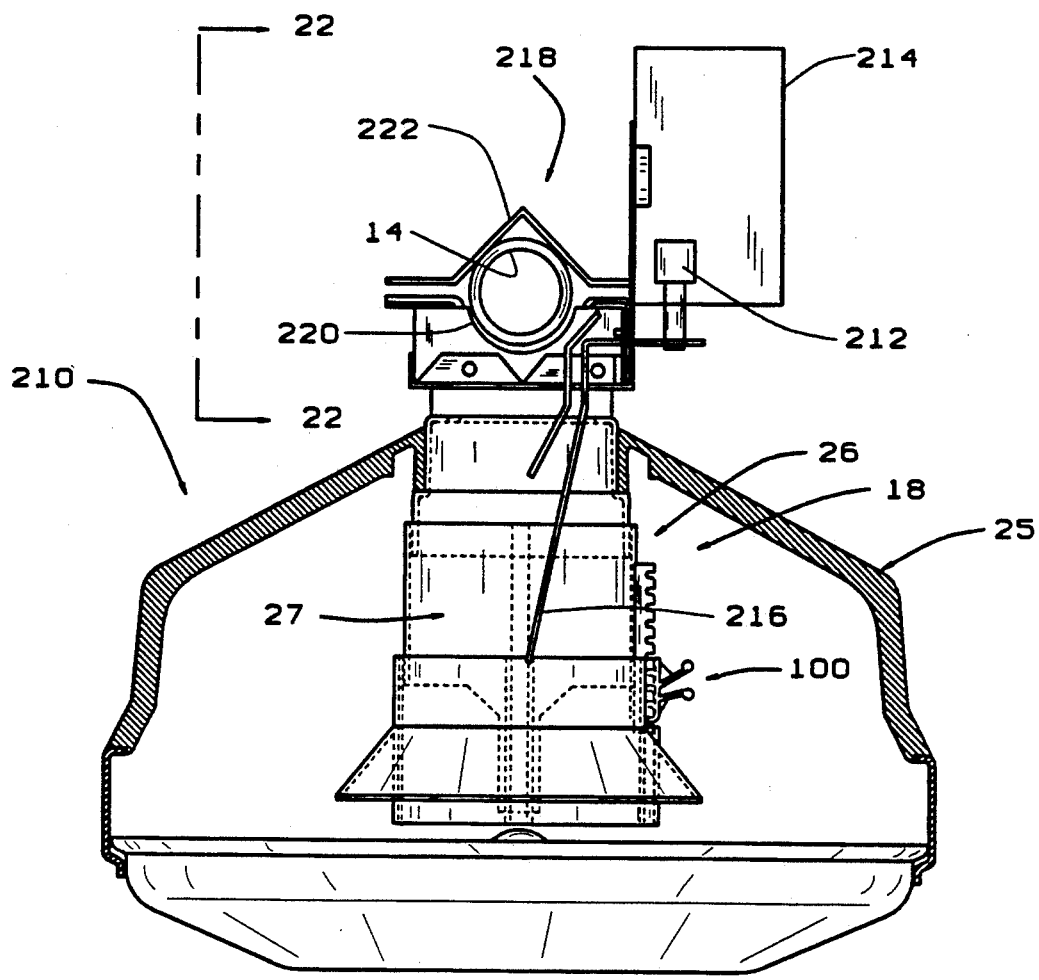
FIG. 21 is a side elevation view of a control feeder unit of the present invention having the same feed pan, drop tube and grill as is employed with the feeders illustrated in FIGS. 5 and 6.
Figure 22:
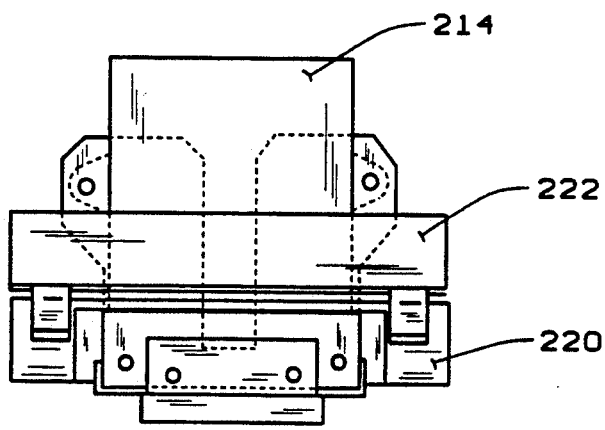
FIG. 22 is a view taken along line 22—22 of FIG. 21 illustrating the manner in which the control feeder shown in FIG. 21 may be removably installed on the feed conveyor tube.

Referring now to FIGS. 21 and 22, a feed control feeder of the present invention is indicated in its entirety at 210. This feed control unit incorporates the same feed pan 23, grill 25 and feed drop tube 18 as the previously described feeder 10 so that the control unit 210 operates and appears similar to feeder 10. In this manner the control unit simulates the appearance and operation of the other feeders 10 in feed line FL. It will be understood that in FIGS. 21 and 22, reference characters less that 210 indicate parts having a similar construction and operation to similar numbered parts of feeder 10.

As best shown in FIG. 21, control feeder 210 has a feed conveyor switch 212 located in a switch box 214. This conveyor switch 212 has a feed sensor 216 located within feed drop tube 18 so as to be responsive to the amount of feed in the drop tube. Of course, the conveyor switch 212 may be connected to operate the electric motors EM for operation and termination of operation of the feed conveyor system FC in a manner well known to those skilled in the art.

More particularly, feed sensor 216 is movable within feed drop tube 18 from a first or tube full position (not shown) to a second or tube empty position (as shown in FIG. 21) for opening and closing switch 212 in response to the amount of feed within the feed drop tube. It will be appreciated that with the feed tube 18 filled with feed such that the feed within the drop tube serves as a feed reservoir for resupplying feed to feed pan 23 as the birds consume feed from feed pan 23, the level of feed within feed drop tube 18 will correspondingly drop. Upon the feed within the drop tube falling below a level which permits the switch arm 216 to move fully to its second or tube empty position (shown in FIG. 21), switch 212 is actuated to turn on the feed conveyor FC thereby to replenish the feed in the feeders 10 and in the control unit 210. As feed is supplied to the control units, the feed will drop down through drop tube 18, fills feed pan 23, and backs up within the drop tube. As the feed fills the drop tube, the switch arm 216 is moved by the feed from its second to its first position. This in turn causes switch 212 to generate a signal which may be used to shut off the feed conveyor FC. In this manner, it is assured that feed is always supplied to the birds.

In FIG. 22, a removable attachment for the control unit to the feed conveyor tube 14 is illustrated in its entirety at 218. More specifically, attachment 218 comprises a lower cradle 220 adapted to engage the conveyor tube from below. An upper cradle 222 is hingedly attached to the lower cradle and overlies the upper portion of the conveyor tube. Bolts (not shown) are used to clamp the upper and lower cradles to the conveyor tube.

While the feeder 10 of the present invention has been particularly described for use with poultry, such as chickens or turkeys, those skilled in the art will recognize that certain features of this invention may well have application in automated feeding systems for other livestock, such as swine.

In view of the foregoing, it will be seen that the several objects of the invention are achieved and other advantageous results are obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A feeder adapted to be installed on a feed conveyor for receiving feed therefrom, said feeder having a connector for installation of said feeder on said feed conveyor, a feed pan for having feed from said conveyor deposited therein, and a feed pan support between said feed pan and said connector including a generally vertically disposed rim proximate said feed pan, said feed pan support permitting relative lost motion movement between said feed pan and said rim between a raised position in which said rim extends up above the level of said feed pan thereby to aid in containing feed within said feed pan and a lowered position in which said rim moves downwardly with respect to said feed pan thereby to lower the height of the feed pan.

2. A feeder as set forth in claim 1 wherein said feed pan support comprises a grill interposed between said connector and said feed pan, and rim constituting a part of said grill.

3. A feeder a set forth in claim 2 wherein said feed pan support comprises a slip fit between said feed pan and said rim.

4. A feeder as set forth in claim 3 wherein said feed pan has an outwardly extending lip on its outer edge, and wherein said rim has a pair of spaced, inwardly projecting shoulders, said feed pan outer edge being held captive between said rim shoulders for slip fit movement of said feed pan between said raised and lowered positions.

5. A feeder adapted to be installed on a feed conveyor for receiving feed therefrom, said feeder having a feed pan for having feed from said conveyor deposited therein, a feed pan support, and a lost motion connection between said feed pan and said feed pan support for permitting relative lost motion movement of said feed pan and said feed pan support between a raised position in which a portion of said feed pan support extends up above the level of said feed pan thereby to aid in containing feed within said feed pan and a lowered position in which said portion of said feed pan support moves downwardly with respect to said feed pan thereby to lower the height of the feed pan.

6. A feeder as set forth in claim 5 wherein said feed pan support comprises a feed drop tube supported from said feed conveyor and a grill carried by said drop tube.

7. A feeder comprising a hanger adapted to be installed on a feed conveyor, said feeder having a feed pan below said hanger for receiving feed from said feed conveyor, a support carried by said hanger for supporting said feed pan, and a connection between said feed pan support and said hanger for permitting relative movement between said feed pan support and said feed conveyor so as to enable said feed pan to rest on the floor and to accommodate a limited range of height variations between the floor and said feed conveyor, said hanger comprising a feed drop tube supported from said feed conveyor, said feed pan support comprising a grill extending between said feed drop tube and said feed pan, said grill having a rim which supports said feed pan, the latter being movable relative to said rim between a raised position in which said extends above the level of said feed pan thereby to aid in containing feed within said feed pan and a lowered position in which said rim moves downwardly with respect to said feed pan thereby to lower the height of the feed pan.

8. A feeder as set forth in claim 7 wherein said feed drop tube has an upper portion fixed with respect to said feed conveyor and a lower portion movable axially with respect to said upper portion between an extended position and a collapsed position, said feed pan being disposed below the bottom end of said feed drop tube for receiving feed.

9. A feeder as set forth in claim 8 wherein said grill has a collar at its upper end for being received on said feed drop tube, and wherein said grill has said rim at its lower end with a plurality of ribs extending from said collar to said rim with said ribs being spaced apart a distance sufficient to permit birds access between said ribs to the feed in said pan.

10. A feeder as set forth in claim 9 wherein said collar is received on the upper portion of said feed drop tube, the latter having a shoulder thereon engageable with the underside of said collar for supporting said grill on said shoulder when said poultry feeder is suspended from said feed conveyor with said feed drop tube in its extended position.

11. A feeder as set forth in claim 10 such that when said collar is supported from said flange on said upper portion of said feed tube, said grill is free to rock on said collar to an inclined position with respect to said feed tube.

12. A feeder as set forth in claim 11 wherein said feed pan and said rim are dimensioned with respect to one another such that upon said feed pan being lowered onto an inclined or irregular floor surface or the like, said feed pan is free to assume an inclined position with respect to said rim.

13. A feeder as set forth in claim 7 wherein said hanger comprises a feed drop tube supported from said feed conveyor, said feed drop tube receiving feed from said feed conveyor and permitting it to drop into said feed pan.

14. A feeder as set forth in claim 13 wherein said feed drop tube comprises an upper drop tube fixed with respect to said feed conveyor tube and a lower drop tube telescopically joined with said upper drop tube for lost motion therebetween.

15. A feeder as set forth in claim 14 wherein said feed pan has a central conical projection extending upwardly from the bottom of said feed pan, and wherein said lower drop tube is engageable with said conical projection of said feed pan, said lower portion of said lower drop tube having a plurality of openings in the bottom reaches thereof contiguous to said conical projection such that the lower portions of said lower drop tube and said conical projection form feed discharge opening such that feed from within said feed tube flows out of said openings, down said conical projection, and into said feed pan.

16. A feeder as set forth in claim 15 wherein said lower drop tube is movable with said feed pan as the latter moves between its said raised and lowered positions such that said discharge openings remain of constant size regardless of the position of the feed pan relative to said grill.

17. A feeder adapted to be installed on a feed conveyor for receiving feed therefrom, said feeder having a connector for installation of said feeder on said feed conveyor, a feed pan for having feed from said feed conveyor deposited therein, and a connection between said feed pan and said connector including a generally vertically disposed rim proximate said feed pan, said feed pan connection permitting relative movement between said feed pan and said rim between a raised position in which said rim extends up above the level of said feed pan when said feed pan is at least in part suspended from said rim thereby to aid in containing feed within said feed pan and a lowered position in which said rim moves downwardly with respect to said feed pan thereby to lower the height of the feed pan when said feed pan is at least in part supported on the floor, said feed pan connection comprising a grill interposed between said connector and said feed pan, said rim constituting a part of said grill, said rim having a pair of spaced, inwardly projecting shoulders, wherein said feed pan has a base which is adapted to bear on the floor of a poultry house or the like and and outer wall which extends up from said feed pan base a predetermined distance thus constituting the height of said feed pan with the height of said feed pan and of said rim corresponding to the effective height of said feed pan when the feeder is in its raised position, the height of said rim relative to the height of said feed pan being such that with the feeder in its collapsed position, the effective height of said rim and said feed pan together being substantially the height of said feed pan, said connection comprising a slip fit between said feed pan outer wall and said rim, said feed pan having an outwardly extending lip on its outer edge, said feed pan outer edge being held captive between said rim shoulders for slip fit movement of said feed pan relative to said rim between said raised and lowered positions.

18. A feeder adapted to be installed on a feed conveyor for receiving feed therefrom, said feeder having a connector for installation of said feeder on said feed conveyor, a feed pan for having feed from said feed conveyor deposited therein, and a connection between said feed pan and said connector including a generally vertically disposed rim proximate said feed pan, said connection permitting relative lost motion movement of said feed pan and said rim between a raised position in which said rim extends up above the level of said feed pan thereby to aid in containing feed within said feed pan and a lowered position in which said rim moves downwardly with respect to said feed pan thereby to lower the height of the feed pan, wherein said connector permits the ready installation and removal of said feeder relative to said feed conveyor tube, said feeder having a feed drop tube for receiving feed from said feed conveyor tube, said connector comprising a pair of spaced apart legs on the upper end of said feed drop tube, said legs having an inner surface cooperable with the outer surface of said feed conveyor with the upper ends of said legs being spaced apart a distance less than the cross section of said feed conveyor such that upon engagement of said feed conveyor and the upper ends of said legs and upon application of force to bring said feed conveyor and said legs together, said legs are spread apart by said feed conveyor to permit said feed conveyor to pass between said legs and to be received within said inner surfaces of said legs.

19. A feeder as set forth in claim 18 wherein said connector further comprises a cap installable on the outside of said legs, said cap being engageable by said legs to resist outward movement of said legs thereby to at least partly aid in retaining said conveyor tube between said legs.

20. A feeder as set forth in claim 19 wherein said cap has a pair of spaced arms, said arms being spaced apart a distance less than the cross section of said feed conveyor and having inner surface for receiving said feed conveyor.

21. A feeder as set forth in claim 20 wherein said upper portion of said feed tube is a unitary molding of a suitable synthetic resin, and wherein said legs are resiliently movable for the snap fit reception of said conveyor tube between said legs.

22. A feeder adapted to be installed on a feed conveyor tube for receiving feed therefrom, said feeder having a connector for installation of said feeder on said feed conveyor tube, a feed pan for having feed from said feed conveyor tube deposited therein, and a connection between said feed pan and said connector including a rim proximate said feed pan, said feed pan connection permitting relative movement between said feed pan and said rim between a raised position in which said rim extends up above the level of said feed pan when said feed pan is at least in part suspended from said rim thereby to aid in containing feed within said feed pan and a lowered position in which said rim moves downwardly with respect to said feed pan thereby to lower the height of the feed pan when said feed pan is at least in part supported on the floor, said feed pan connection comprising a grill interposed between said connector and said feed pan, said rim constituting a part of said grill, said feed pan having a base which is adapted to bear on the floor of a poultry house or the like and an outer wall which extends up from said base a predetermined distance thus constituting the height of said feed pan with the height of said feed pan and of said rim corresponding to the effective height of said feed pan when the feeder is in its raised position, the height of said rim relative to the height of said feed pan being such that with the feeder in its collapsed position the effective height of said rim and said feed pan together is substantially the height of said feed pan, said connection comprising a slip fit between said feed pan outer wall and said rim, said rim having a pair of spaced, inwardly projecting shoulders, said feed pan having a outwardly extending lip on its outer edge, said feed pan outer edge being held captive between said rim shoulders for slip fit movement of said feed pan relative to said rim between said raised and lowered positions, said connector comprising a feed drop tube supported from said feed conveyor tube, said feed drop tube receiving feed from said feed conveyor and permitting it to drop into said feed pan, said feed drop tube comprising an upper drop tube fixed with respect to said feed conveyor tube and a lower drop tube telescopically joined with said upper drop tube for lost motion therebetween, said feeder further comprising an outer control tube received on the exterior of said lower drop tube, said control tube having a lower edge and being axially adjustable with respect to said lower drop tube so as to selectively cover and uncover some or all of said discharge openings in said lower drop tube thereby to regulate the amount of feed discharged from said feed tube via said openings.

23. A feeder as set forth in claim 22 further comprising means for adjustably securing said outer control tube in a desired axial position with respect to said lower drop tube thereby to adjust the amount of feed discharged from said openings.

24. A feeder as set forth in claim 23 wherein said adjustably securing means comprises a pawl carried by said control tube and a rack carried by said lower drop tube such that with said control tube in a desired axial position on said lower drop tube, said pawl can be selectively engaged with said rack thereby to secure said control tube to said lower drop tube, and such that to adjust said control tube with respect to said lower drop tube, said pawl is disengaged from said pawl thereby to permit said outer tube to be axially adjusted with respect to said lower drop tube.

25. A feeder to be installed on a feed conveyor, the latter comprising a feed conveyor tube through which feed is conveyed to one or more of said feeders, said feeder comprising a feed pan, a drop tube adapted to be secured to said feed conveyor tube for receiving feed therefrom and for delivering the feed into said feed pan, a grill carried by said drop tube, said grill mounting said feed pan for generally vertical lost motion movement of said feed pan relative to said grill between an extended position and a collapsed position, said grill having a plurality of ribs extending downwardly toward said feed pan, a rim secured to the lowered ends of said ribs, the height of said feed pan and of said rim when the latter are in their said collapsed positions being sufficiently low so as to permit a young chick to readily view feed discharged into said feed pan.

26. A feeder as set forth in claim 25 wherein said feed conveyor tube may be selectively raised and lowered with respect to the floor of a poultry house or the like from a lowered position in which said feed pan rests on the floor of said poultry house to a raised position, and wherein with said feed pan resting on said poultry house floor with said feed pan and said rims in their said collapsed positions, said feed pan will remain resting on said floor as said feeder is raised with said feed conveyor tube until the lost motion of the lost motion connection therebetween is taken up.

27. A feeder as set forth in claim 26 wherein said feed drop tube comprises an upper portion and a lower portion with a second lost motion connection between said upper and lower feed drop tube portions, said grill having a collar on its upper end, said collar receiving said upper portion of said feed drop tube, said upper portion of said feed drop tube having means for engagement with said collar for moving said grill with said upper feed drop tube portion as the latter is raised with said feed conveyor tube, and with said grill in its lowermost position with respect to said feed pan, said engagement means carried by said upper portion of said feed drop tube being movable downwardly clear of said collar such that said collar and said engagement means on said upper portion of said drop tube constituting a third lost motion connection between said grill and said feed drop tube and permitting relative lost vertical motion therebetween.

28. A feeder as set forth in claim 27 wherein said lower portion of said feed drop tube is telescopically received on the outside of said upper portion of said feed drop tube such that said upper and lower portions are movable telescopically relative to one another.

29. A feeder as set forth in claim 28 wherein said lower portion of said feed drop tube having a plurality of openings in the lower reaches thereof for the discharge of feed from said drop tube into said feed pan, said lower portion of said feed drop tube having an outer tube received thereon with a lower edge of said outer tube being axially adjustable with respect to said lower portion of said feed drop tube so as to selectively cover and uncover some or all of said openings in said lower portion of said feed drop tube thereby to regulate the amount of feed discharged from said feed tube via said openings.

30. A feeder as set forth in claim 29 further comprising means for adjustably securing said outer tube in a desired axial position with respect to said lower portion of said feed drop tube thereby to adjust the amount of feed discharged from said openings.

31. A feeder as set forth in claim 30 wherein said adjustable securing means comprises a pawl and rack carried by said lower portion of said feed drop tube and by said outer tube such that with said outer tube in a desired position on said lower portion of said feed drop tube, said pawl can be selectively engaged with said rack thereby to secure said outer tube to said lower portion of said feed drop tube, and such that to adjust said outer tube with respect to said lower portion of said feed drop tube, said pawl may be disengaged from said rack thereby to permit said outer tube to be axially adjusted with respect to said lower potion of said feed drop tube.

32. A feeder as set forth in claim 31 wherein said outer tube has an shield thereon proximate the lower end of the outer tube so as to prevent birds from raking feed from said openings in the lower end of said lower portion of said feed drop tube.

33. A feeder as set forth in claim 28 wherein said feed pan has a conical projection at the center thereof substantially axial alignment with said feed drop tube, the slope angle of said conical projection being substantially the same as the angle of repose of said feed discharged from said openings in said drop tube such the feed is distributed to the outer reaches of said feed pan.

34. A poultry feeder system for use in a poultry house having a floor, a feeder line including a feed conveyor tube with a multiplicity of feeders mounted thereon, said feeder line being suspended from the roof or the like of said poultry house by means of a lift for raising and lowering said feeder line along with said feeders with respect to the floor of said house, wherein each of said feeders comprises a feed drop tube adapted to be connected to said feed conveyor tube for receiving feed therefrom, a feed pan for receiving feed from said feed drop tube, a grilled carried by said feed drop tube, said grill having a rim for supporting said feed pan for movement of the feed pan relative to said rim between a raised position in which the rim is raised with respect to the feed pan thereby to aid in preventing birds from raking feed out of said feed pan, and a lowered position in which the feed pan is resting on the floor and in which the rim is moved down with respect to the feed pan so as to allow young chicks to more readily see feed within said feed pan and to permit ingress of the young chicks into the feed pan for access to said feed.

35. A poultry feeding system as set forth in claim 34 wherein said grill of said feeder has a collar which is slidably received on said feed drop tube for axial movement therealong between a first position and a second position so as to permit movement of the feeder with respect to said conveyor tube as said feed line is raised and lowered so as to accommodate variations in floor height relative to said feed conveyor tube.

36. A poultry feeding system as set forth in claim 35 wherein said feed drop tube comprises an upper drop tube and a lower drop tube, said upper and lower drop tubes being axially movable with respect to one another so as to permit movement of said feed pan toward and away from said feed conveyor tube.

37. A poultry feeding system as set forth in claim 36 wherein said lower drop tube has at least one opening in its lower end which is cooperable with said feed pan thereby to constitute a feed discharge opening for the discharge of feed from within said feed drop tube into said feed pan, said lower drop tube being movable with said feed pan such that said discharge openings remain of constant size as said feed pan moves up and down with respect to said feed conveyor line.

38. A poultry feeding system as set forth in claim 37 wherein said feed line includes a feed conveyor including said feed conveyor tube, a conveyor element movable within said conveyor tube, and a motor for driving said conveyor element within said conveyor tube, said system further comprising at least one feed control unit for controlling at least certain operations of said feed conveyor, said feed control unit is connected to said feed conveyor tube and has a drop tube, grill and feed pan similar to said feeders such that said feed control unit is substantially the same size and operates substantially similar to said feeders, said feed control unit having a sensor for sensing the amount of feed within said feed drop tube so as to generate a signal in response to the amount of feed within said feed drop tube so as to control operation of said feed conveyor.

39. A poultry feeding system as set forth in claim 38 wherein said feed control unit includes means for releasably connecting said feed control unit to said conveyor tube at any location therealong in place of one of said feeders.

40. The method of introducing young chicks into a poultry house and feeding them directly from feed deposited in a plurality of feeding stations, each feeding station having a feed pan supplied with feed from an overhead feed conveyor, said feed conveyor having the capability of being selectively raised and lowered together with said feed stations relative to the floor of said poultry house, said method comprising the steps of:
  lowering said feed conveyor toward the floor of the poultry house such that the feed pan of one or more of said feeding stations rests of the floor;
  lowering the height of the sides of said feed pan to a height such that with the feed pan in this lowered position, young chicks can readily see the feed deposited in said feed pan;
  allowing access of the young chicks into the feed pan so that they may readily consume the feed in the feed pan; and
  upon the chicks growing in height, raising the feed conveyor such that by way of a lost motion connection, the sides of the feed pan are raised from its said lowered position so as to permit the now larger birds still to access the feed in the feed pan while the birds stand on the ground with the raised sides of the feed pan acting to prevent the larger birds from raking feed from the feed pan.

41. The method of claim 40 further comprising the step of, as said feed conveyor is lowered toward the floor, permitting relative movement of the feed pans of at least certain of said feeders which first contact said floor to move relative to said feed conveyor thereby to prevent said certain feeders from supporting a major portion of the weight of said feed conveyor until substantially all of said feed pans of substantially all of said feeders are in engagement with said floor of said poultry house.

42. The method of introducing young chicks into a poultry house and feeding them directly from feed deposited in a plurality of feeding stations, each feeding station having a feed pan supplied with feed from an overhead feed conveyor, at least some of said feed pans having the capability of being selectively raised and lowered relative to the floor of said poultry house, said method comprising the steps of:
  lowering at least some of said feed pans toward the floor of the poultry house such that the feed pan of one or more of said feeding stations rests of the floor;
  lowering the height of the sides of said feed pan to a height such that with the feed pan in this lowered position, young chicks can readily see the feed deposited in said feed pan;
  allowing access of the young chicks into the feed pan so that they may readily consume the feed in the feed pan; and
  upon the chicks growing in height, raising the feed conveyor, and raising the sides of the feed pans so as to permit the now larger birds still to access the feed in the feed pan while the birds stand on the floor with the raised sides of the feed pan acting to prevent the large birds from wasting feed from the feed pan.

43. The method of introducing young chicks into a poultry house and feeding them directly from feed deposited in a plurality of feeding stations, each feeding station having a feed pan supplied with feed from an overhead feed conveyor, each said feed pan having the capability of having its depth selectively raised and lowered between a shallow pan position and a deep pan position, said method comprising the steps of:
  positioning said feed pans on the floor of said poultry house with the feed pans in their shallow pan positions thereby to enable young chicks to readily see feed in said feed pan and to readily ingress and egress from the feed pan for feeding;
  and, upon the young chicks growing in size, changing the height of said feed pans to said deep pan position such that the depth of said feed pans is sufficient so as to prevent the birds from raking undue amounts of feed from said feed pan, said step of changing the height of said feed pans to said deep pan position being accomplished by raising said feed stations with respect to the floor of said poultry house.

44. A poultry feeder having a drop tube adapted to be operatively connected to a feed conveyor such that said drop tube receives feed therefrom, a feed pan for receiving feed from said drop tube, a grill carried by said drop tube, said grill mounting said feed pan for movement relative to said grill between a raised position in which a portion of said grill extends up above the level of said feed pan thereby to aid in preventing poultry from raking feed from said feed pan and a lowered position wherein said portion of said grill is moved down with respect to said pan such that the effective height of said feed is such that young poultry can readily see feed within said feed pan, said feed pan being carried by said grill in such manner as to not only permit movement of said feed pan relative to said grill between its raised and lowered positions, but also to permit angular movement of said feed pan with respect to said grill such as when said feed pan bears on a non-even floor, said grill being mounted on said drop tube in such manner as to permit both limited vertical and rocking movement of said grill relative to said drop tube.

45. A poultry feeder (10) adapted to be installed on a feed conveyor (14) in a poultry house (H) or the like, said feeder having a drop tube (18) adapted to be operatively connected to said feed conveyor for receiving feed therefrom, a feed pan (23) for receiving feed from said drop tube, said feed pan having a feed pan base (34) and an upwardly extending sidewall (38), and a grill (25) received on said drop tube, said grill having a collar (44) adapted to receive said drop tube and a plurality of grill ribs (48) extending downwardly from said collar, a rim (46) carried by the lower ends of said grill ribs, said drop tube including an upper drop tube (26) and a lower drop tube (27) having a telescopic connection relative to one another, said lower drop tube having openings (22) therein for delivery of feed from said conveyor into said feed pan, said telescopic connection between said upper and lower drop tubes constituting a first lost motion connection (29) thereby to permit relative movement of said feed pan and said conveyor toward and away from one another, a second lost motion connection (32) between said feed pan and said grill for enabling relative vertical movement of said feed pan and said grill between a raised position and a lowered position, and a third lost motion connection (52) between said collar and said drop tube to permit relative vertical and rocking movement between said collar and said drop tube thereby to accommodate unevenness in the level of the floor of said poultry house.

46. A poultry feeder as set forth in claim 45 wherein said lower drop tube is engageable with said feed pan for movement therewith as the latter moves up and down upon movement of said first lost motion connection (29).

47. A poultry feeder as set forth in claim 46 wherein said lower drop tube has a plurality of legs (42) extending downwardly from the bottom thereof for engagement with said feed pan base, said openings (22) for the discharge of feed being between said legs, said legs remaining in engagement with said pan as the latter moves up and down upon movement of said first lost motion connection (29).

48. A poultry feeder as set forth in claim 47 further having a tubular member (92) adjustably movable on said lower drop tube (27) for regulating the flow of feed out of said openings (22).

* * * * *

UNITED STATES PATENT AND TRADEMARK OFFICE
CERTIFICATE OF CORRECTION

PATENT NO. : 5,311,839
DATED : May 17, 1994
INVENTOR(S) : Eugene B. Pollock; Jeffrey Knollenberg It is certified that error appears in the above-indentified patent and that said Letters Patent is hereby corrected as shown below:

Column 17, line 45, delete "and" (second occurrence) and insert —an—;
Column 21, line 3, delete "grilled" and insert —grill—

Signed and Sealed this

Thirty-first Day of January, 1995

Attest:

BRUCE LEHMAN

*Attesting Officer*          *Commissioner of Patents and Trademarks*